May 24, 1927.
F. HOFFMAN
LOCK NUT
Filed Dec. 13, 1926
1,629,503
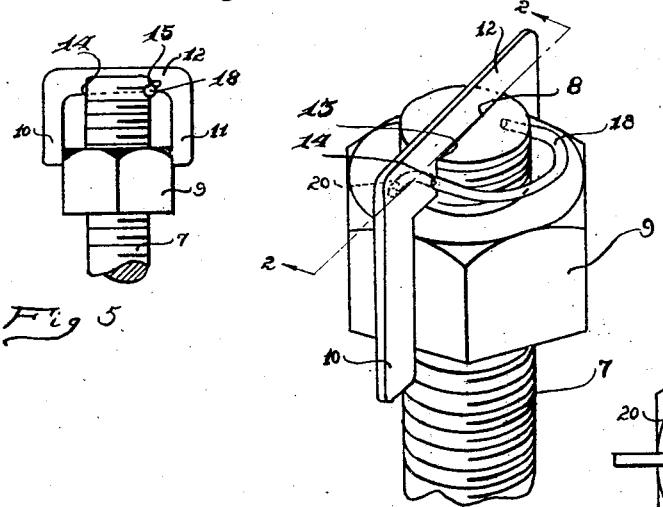
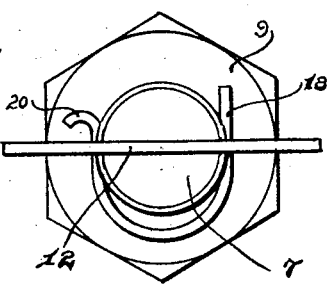
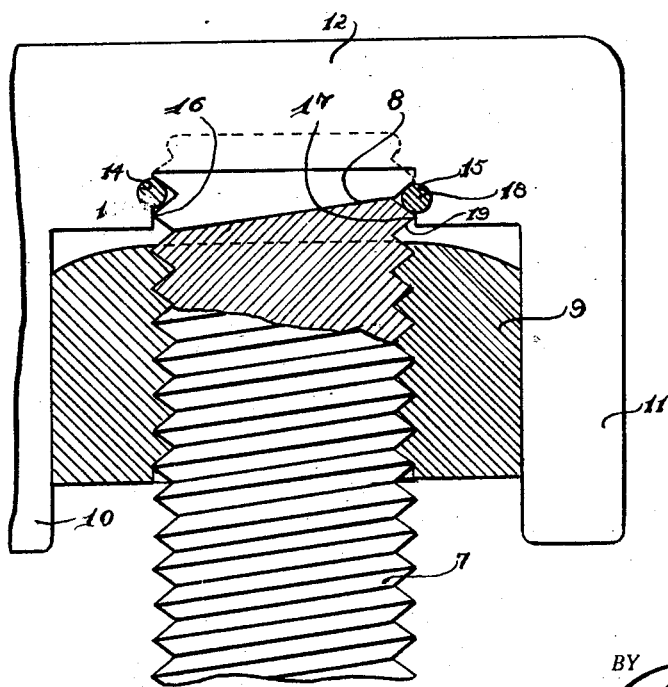
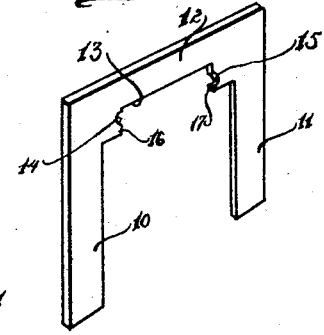
INVENTOR.
Frank Hoffman
BY
Thos S Donnelly
ATTORNEY.

Patented May 24, 1927.

1,629,503

UNITED STATES PATENT OFFICE.

FRANK HOFFMAN, OF DETROIT, MICHIGAN.

LOCK NUT.

Application filed December 13, 1926. Serial No. 154,437.

My invention relates to a new and useful improvement in a lock nut and has for its object the provision of a device whereby the nut may be securely and easily locked on a bolt so as to prevent its undue turning thereon.

Another object of the invention is the provision of a device whereby the nut may be locked on the bolt regardless of the position of the nut on the bolt out of predetermined limits.

Another object of the invention is the provision of a device whereby the threads are used as co-operating means for locking the nut locking member on the bolt.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention showing a bolt in fragment.

Fig. 2 is a fragmentary sectional view taken on substantially line 2—2 of Fig. 1, enlarged.

Fig. 3 is a top plan view of the invention applied.

Fig. 4 is a perspective view of the locking member used with the invention.

Fig. 5 is a side elevational view of the invention showing it applied and the nut threaded well on to the bolt.

As shown in the drawings, the bolt 7 is provided with a diametrically extending slot 8 on its threaded nut, this slot in no manner interfering with the threading of the nut 9 on the bolt. As a locking member for locking the nut 9 on the bolt 7 I have provided a U shaped member, the legs 10 and 11 being adapted to engage opposite faces of the nut 9. The bight 12 of this U shaped member is provided with the recess 13 formed therein. At opposite sides of the recess are formed semispherical notches 14 and 15, and it will be noted that these notches 14 and 15 are not in alignment with each other, but are slightly offset. These notches are offset a distance depending upon the size and nature of the thread on the bolt with which they are used, the distance of offset being equal to one-half of the axial travel effected on the bolt by a single turn on the thread. After the nut 9 is threaded on the bolt 7 the U shaped member is mounted in position, as shown in Fig. 1 and Fig. 5, the legs 10 and 11 engaging the faces of the nut 9 and the bight at the recess 13 engaging in the slot 8, the side walls 16 and 17 of the recess 13 embracing the bolt 7. After this U shaped locking member is mounted in position as shown, a pin or wire 18 may be forced into the notch 14 or 15, this pin engaging between the threads 19, as shown in Fig. 2. In the form shown in the drawings, I have shown the pin or wire 18 doubled upon itself to provide a U shaped member so as to engage in each of the recesses 14 and 15. One end 20 of the wire is then angularly turned to prevent its slipping from engagement in the recesses 14 and 15. It is believed evident that the device, when it is mounted on the nut, is irremovable therefrom until the wire member 18 is detached from engagement in the recesses 15 and 14, so that the nut 9 is securely locked on the bolt 7 and prevented from turning in either direction.

If desired, the wire 18 may be engaged in one of the recesses 14 or 15 as the tight fit of the wire in the recesses will prevent the removal of the U shaped locking member from operative position.

While I have illustrated and described the preferred form of construction, I do not wish to limit myself to the precise form of structure shown, but desire to avail myself of such variations and modifications as may come within the scope of the appended claims.

Having thus described my invention what I claim as new and desire to secure by Letters Patent is:

1. A lock nut of the class described adapted for use with a bolt having a diametrically extending slot formed on its threaded end and adapted for the reception of a nut having opposite flat faces, comprising: a U shaped member having a recess formed on the inner surface of its bight, the edge walls of said recess having a notch formed therein, the legs of said U shaped member being adapted for positioning in engagement with opposite faces of said nut and said bight engaging in said slot; and a separable pin adapted for driving into said notch engaging between threads of said bolt for preventing removal of said U shaped member therefrom.

2. A device of the class described adapted for use with a bolt having a diametrically extending slot formed in its threaded end and adapted for the reception of a nut having oppositely disposed flat faces, comprising: a U shaped locking member having a recess formed on the inner surface of its bight, the edge walls of said recess each being provided with a notch formed therein, said notches being out of alignment with each other, said legs being adapted for embracing opposite faces of said nut upon engagement of said bight in said slot; and a separable locking member adapted for engaging in said notches, and between threads of said nut for preventing removal of said locking member from said bolt.

3. A device of the class described adapted for use with a bolt having a diametrically extending slot formed in its threaded end and adapted for the reception of a nut having oppositely disposed flat faces, comprising: a U shaped locking member, the bight thereof being adapted for engagement in said slot and the legs for engaging opposite faces of said nut, a notch being formed in an inwardly directed face of said locking member in alignment with the space between threads of said bolt; and a separable locking member adapted for engagement in said notch and in said space for preventing removal of said locking member from said bolt.

In testimony whereof I have signed the foregoing specification.

FRANK HOFFMAN.